UNITED STATES PATENT OFFICE.

SAMUEL PEACOCK, OF PHILADELPHIA, PENNSYLVANIA, ASSIGNOR, BY MESNE ASSIGNMENTS, TO AGRICULTURAL RESEARCH CORPORATION, OF NEW YORK, N. Y., A CORPORATION OF NEW YORK.

PROCESS OF MAKING ALUMINUM PERNITRIDS.

1,134,414.  Specification of Letters Patent.  Patented Apr. 6, 1915.

No Drawing.  Application filed April 18, 1914.  Serial No. 832,817.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Making Aluminum Pernitrids; and I do hereby declare the following to be a full, clear, and exact description of the invention, such as will enable others skilled in the art to which it appertains to make and use the same.

This invention relates to a process of producing pernitrids of aluminum and has for its object to produce these compounds in an efficient and comparatively inexpensive manner.

With these and other objects in view the invention consists in the novel steps constituting my process and in the novel product hereinafter more fully disclosed and particularly pointed out in the claims.

In carrying out my process I provide a suitable mixture of carbon, and a phosphate rock carrying alumina. One variety of such rock is the well known "Redonda phosphate." I then heat this mixture in an atmosphere of nitrogen to a temperature substantially between 1500° and 1700° C., while preferably maintaining the partial pressures of the evolved carbon monoxid below 200 millimeters of mercury, whereupon volatile and solid aluminum carbo-nitrids will be formed having the approximate formula $Al_2C_3N_6$. Especially will these carbo-nitrids be formed if the total pressure in the furnace is maintained below that of the atmosphere. On the other hand, if the heating be carried well up to 1700° there will be a tendency to decompose these carbonitrids and to form new compounds such as $Al_3N_4$. The production of these pernitrids is further facilitated when the pressure in the furnace is maintained above that of the atmosphere, and in such case they will be produced at a lower temperature than is required when the pressure is below that of the atmosphere. When the pressure is high and the temperature also high, pernitrids such as $Al_2N_3$ are also formed. By raising the temperature still higher to 1800° C. these pernitrids break down and the well known aluminum nitrid $Al_2N_2$ is produced. These pernitrids are produced in both the volatile and the solid forms but are found upon treatment with hot water at 200° C. to form no more ammonia than does the well known aluminum nitrid $Al_2N_2$.

What I claim is:

1. The process of producing aluminum pernitrids having a plurality of nitrogen atoms to each atom of aluminum which consists in heating a mixture of carbon and aluminum phosphate in an atmosphere of nitrogen to a temperature too high to form volatile aluminum carbo-nitrids and too low to form aluminum nitrid, substantially as described.

2. The process of producing aluminum pernitrids having a plurality of combined nitrogen atoms to each atom of aluminum which consists in heating a mixture of finely divided aluminum phosphate and carbon in an atmosphere of nitrogen to substantially 1700° C. while maintaining the partial pressures of the reaction products below 400 millimeters of mercury, substantially as described.

3. The process of producing a volatile product containing a metal combined with nitrogen and constituting a pernitrid which consists in heating a mixture of carbon and a metal combined with another element in an atmosphere containing free nitrogen to a temperature sufficient to produce said volatile product, and suitably recovering said volatile product substantially as described.

In testimony whereof I affix my signature, in presence of two witnesses.

SAMUEL PEACOCK.

Witnesses:
T. A. WITHERSPOON,
FRANCES SIEBEL.

Copies of this patent may be obtained for five cents each, by addressing the "Commissioner of Patents, Washington, D. C."